United States Patent
Lin et al.

(10) Patent No.: US 10,793,225 B2
(45) Date of Patent: Oct. 6, 2020

(54) BICYCLE WIRELESS COMMUNICATION METHOD AND SYSTEM THEREOF

(71) Applicant: TEKTRO TECHNOLOGY CORPORATION, Changhua County (TW)

(72) Inventors: Pao-Wen Lin, Changhua County (TW); Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 164 days.

(21) Appl. No.: 16/127,523

(22) Filed: Sep. 11, 2018

(65) Prior Publication Data

US 2019/0241236 A1   Aug. 8, 2019

(30) Foreign Application Priority Data

Feb. 2, 2018  (TW) .............................. 107103799 A

(51) Int. Cl.
| | |
|---|---|
| *B62M 25/08* | (2006.01) |
| *H04W 76/15* | (2018.01) |
| *B62M 9/122* | (2010.01) |
| *B62M 9/132* | (2010.01) |
| *B62M 25/00* | (2006.01) |
| *H04W 4/80* | (2018.01) |

(52) U.S. Cl.
CPC ............ *B62M 25/08* (2013.01); *B62M 9/122* (2013.01); *B62M 9/132* (2013.01); *H04W 76/15* (2018.02); *B62M 2025/003* (2013.01); *B62M 2025/006* (2013.01); *H04W 4/80* (2018.02)

(58) Field of Classification Search
CPC ............ B62M 25/08; B62M 2025/003; B62M 2025/006; B62M 9/122; B62M 9/132
See application file for complete search history.

(56) References Cited

U.S. PATENT DOCUMENTS

| | | | |
|---|---|---|---|
| 2004/0193372 A1* | 9/2004 | MacNeille | G08G 1/163 701/468 |
| 2014/0102237 A1* | 4/2014 | Jordan | B62M 25/08 74/473.12 |
| 2016/0257370 A1* | 9/2016 | Hashimoto | B62M 25/08 |
| 2017/0245285 A1* | 8/2017 | Palin | H04W 8/005 |

* cited by examiner

*Primary Examiner* — Edwin A Young
(74) *Attorney, Agent, or Firm* — Locke Lord LLP; Tim Tingkang Xia, Esq.

(57) ABSTRACT

A wireless communication method adapted to an electrical gear-shifting system of bicycle comprises: establishing a first communication connection to an intermediate device by a master controller; establishing a second communication connection to the intermediate device by a slave controller, sending a control signal to the intermediate device through the first communication connection by the master controller, sending the control signal to the slave controller through the second communication connection by the intermediate device, wherein the slave controller controls a motor driver to perform a gear-shifting operation according to the control signal.

15 Claims, 2 Drawing Sheets

BICYCLE WIRELESS COMMUNICATION METHOD AND SYSTEM THEREOF

CROSS-REFERENCE TO RELATED APPLICATIONS

This non-provisional application claims priority under 35 U.S.C. § 119(a) on Patent Application No(s). 107103799 filed in Taiwan, R.O.C. on Feb. 2, 2018, the entire contents of which are hereby incorporated by reference.

TECHNICAL FIELD

The disclosure relates to a wireless communication method, more particularly to a wireless communication method adapted to an electrical gear-shifting system of bicycle.

BACKGROUND

The electronic gear-shifting system is a milestone in the history of the development of bicycle kits. The gear cable in the conventional mechanical gear-shifting system is manually stretched for changing the gear ratio, and the problems such as gear cable stretching, housing damage will emerge in the long run. The electronic gear-shifting system uses electrical signals to control the servomotor to adjust the gears, the gear-shifting operation is stable when changing speed. In addition, the keystroke of the control buttons of controllers installed on bicycle's handlebar is fixed and the position of the buttons does not change due to vibration during cycling, so the gear-shifting operation is accurate and fast. The electronic gear-shifting system can also reduce the chain wear as well as be easily maintained, and the performance of gear-shifting does not change over time.

In the electrical gear-shifting system of the bicycle, the use of wireless communication to connect the left and the right shift levers with the front and the rear derailleurs has already become a popular trend.

SUMMARY

According to one or more embodiment, a wireless communication method adapted to an electrical gear-shifting system of bicycle comprising: establishing a first communication connection to an intermediate device by a master controller; establishing a second communication connection to the intermediate device by a slave controller; sending a control signal to the intermediate device through the first communication connection by the master controller; and sending the control signal to the slave controller through the second communication connection by the intermediate device; wherein the slave controller controls a motor driver to perform a gear-shifting operation according to the control signal.

According to one or more embodiment, a wireless communication system of bicycle comprising: a master controller comprising a trigger device and a first communication unit, wherein the trigger device electrically connects to the first communication unit, the trigger device is configured to generate a control signal according to a trigger event, and the first communication unit is configured to send the control signal; a slave controller comprising a driving device and a second communication unit, wherein the driving device electrically connects to the second communication unit, the driving device is configured to drive a controlled device according to the control signal, and the second communication unit is configured to receive the control signal; and an intermediate device comprising a first communication connection with the master controller and a second communication connection with the slave controller, wherein the intermediate device is configured to send a broadcast signal for establishing the first communication connection to the master controller and the second communication connection to the slave controller respectively, and the intermediate device receives the control signal through the first communication connection and sends the control signal through the second communication connection.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
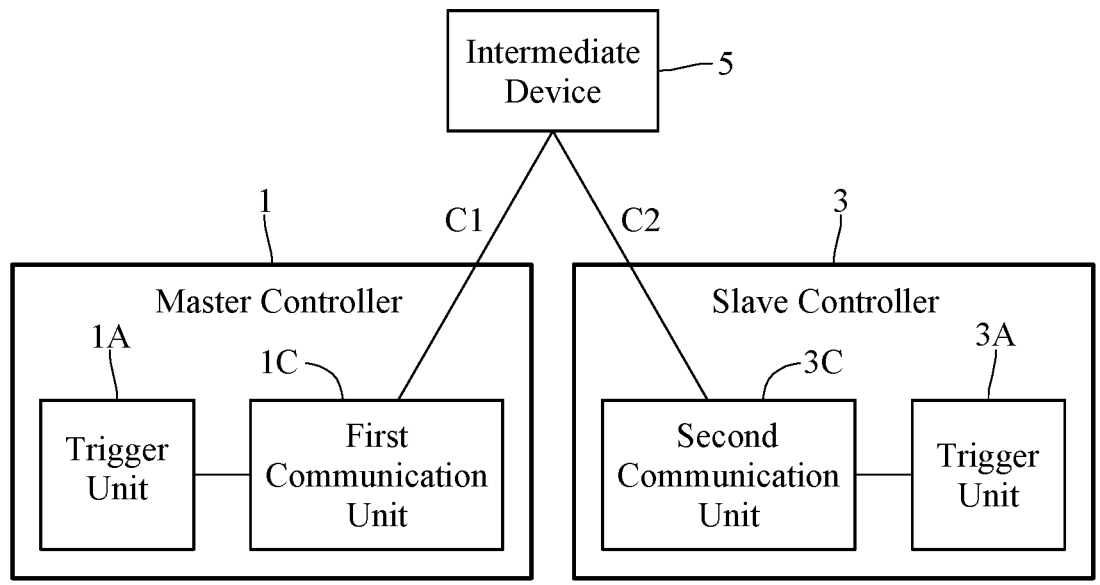
FIG. 1 is a schematic diagram of the wireless communication system of bicycle according to the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. The wireless communication system of bicycle according to the first embodiment of the present disclosure comprises a master controller 1, a slave controller 3 and an intermediate device 5. The master controller 1 comprises a trigger unit 1A and a first communication unit 1C. The trigger unit 1A electrically connects to the first communication unit 1C. The trigger unit 1A may be such as buttons, switches, timers, or even a plurality of buttons configured to trigger different events respectively. The trigger unit 1A generates a control signal according to a trigger event, such as switching the switches, pressing the buttons, reaching a default time by the timer. The first communication unit 1C sends the control signal generated by the trigger unit 1A in a wireless communication manner (ok).

The slave controller 3 comprises a driving device 3A and a second communication unit 3C. The driving device 3A electrically connects to the second communication unit 3C. The second communication unit 3C receives the control signal in a wireless communication manner and sends the received control signal to the driving device 3A. The driving device 3A is, for example, a motor driver. The driving device 3A drives a controlled device according to the control signal.

The intermediate device 5 has a first communication connection C1 with the master controller 1 and a second communication connection C2 with the slave controller 3. Specifically, the intermediate device 5 is configured to send a broadcast signal to establish the first communication connection C1 to the master controller 1 and the second communication connection C2 to the slave controller 3 respectively. The intermediate device 5 receives the control signal through the first communication connection C1 and sends the control signal through the second communication connection C2.

Figure 2:
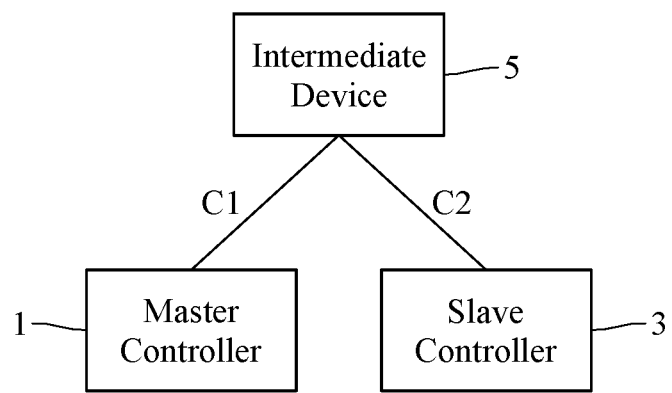
FIG. 2 is a schematic diagram of the communication connections of the wireless communication method of bicycle according to the first embodiment of the present disclosure.

Please refer to FIG. 2, which is a schematic diagram of the communication connections of the wireless communication method of bicycle according to the first embodiment of the present disclosure. The wireless communication method of bicycle is adapted to the wireless communication system of bicycle as shown in FIG. 1. In this embodiment, the master controller 1 of the wireless communication system is equivalent to the left or the right shift lever while the slave controller 3 is equivalent to the front or rear derailleur. The installation positions relative to the frame will be described in the following paragraph.

In the first embodiment of the wireless communication method according to the present disclosure, the first communication connection C1 is established between the master controller 1 and the intermediate device 5, and the second communication connection C2 is established between the slave controller 3 and the intermediate device 5. The established order of communication connections C1 and C2 is not limited. The manners to establish the communication connections C1 and C2 are basically identical. The establishment of the first communication connection C1 is used as an example for illustration. A user triggers the intermediate device 5 to send a broad signal. The trigger manner is, for example, to press the trigger unit such as the button or the switch on the intermediate device 5. After receiving the broadcast signal, the master controller 1 ensures whether the broadcast signal includes a trustworthy information (such as the device identification number of the intermediate device 5). The master controller 1 returns a handshake signal or an acknowledgment signal to the intermediate device 5 if the broadcast signal includes a trustworthy information, thereby establishing the first communication connection C1. The master controller 1 stays in the original state without performing any communication operation if the broadcast signal sent by the intermediate device 5 does not include the trustworthy information. The aforementioned broadcast signal initiator and receiver may also be opposite, that is, the user triggers the master controller 1 to send the broadcast signal, the intermediate device 5 receives the broadcast signal and ensures whether the broadcast signal includes the trustworthy information for establishing the first communication connection C1.

In practice, the first communication connection C1 and the second communication connection C2 adopt the same communication standard such as ANT+, Bluetooth, BLE (Bluetooth Low Energy), ZigBee, NFC, etc. However, the above is not intended to limit the communication standard that can be employed in the present disclosure. The developer may also define a wireless communication standard on his own to satisfy the transmission requirement of low power consumption in the electrical gear-shifting system using in a bicycle. In practice, the intermediate device 5 is a hardware device that can perform one or more communication standards mentioned before, such as a smartphone supporting the Bluetooth communication protocol.

The master controller 1 sends the control signal to the intermediate device 5 through the first communication connection C1 after the first communication connection C1 and the second communication connection C2 are established. The intermediate device 5 forwards the control signal to the slave controller 3 through the second communication connection C2 after the intermediate device 5 receives the control signal. The slave controller 3 controls the motor driver (not depicted) according to the control signal to drive the servomotor to switch over the speed change gear to perform the gear-shifting operation indicated by the control signal. Through the above steps, which is the communication method of the first embodiment of the present disclosure, the user may send the gear-shifting instruction from the shift levers and use the signal transmission of the intermediate device 5 to complete the gear switch of the bicycle.

In the first embodiment of the present disclosure, besides the transmission way that the master controller 1 sends the control signal to the slave controller 3 through the intermediate device 5, the slave controller 3 may also send a status signal to intermediate device 5 through the second communication connection C2. After receiving the status signal, the intermediate device 5 selectively sends the status signal to the master controller 1 through the first communication connection C1. In practice, the status signal is for reporting the gear information of the motor driver or the power information of the slave controller 3 itself. The intermediate device 5 further comprises a display unit, such as the screen of the smartphone. The intermediate device 5 displays the gear information or the power information through the display unit according to the content of the status signal for the user to view. On the other hand, the intermediate device 5 may also transmit the status signal received from the slave controller 3 to the master controller 1 for further usage, which is not limited by the present disclosure. Based on the previous description, the control signal comprises not only the gear-shifting instruction for controlling the slave controller 3 but also the gear information recorded by the master controller 1 or the power information of the master controller 1 itself. The intermediate device 5 uses the display unit to present the gear information or the power information according to the content of the control signal for the user to view after receiving the control signal.

The master controller 1 detects the first communication connection C1 after the first communication connection C1 is established. The detection manner is, for example, sending the broadcast signal periodically and waiting for the response. The master controller 1 immediately enters into the sleep mode after detecting that the first communication connection C1 is disabled. Similarly, the slave controller 3 detects the second communication connection C2 after the second communication connection C2 is established. When the second communication connection C2 is disabled, the slave controller 3 enters into the sleep mode. Based on the detection mechanism of the communication connection described above the verification mechanism when the communication connections C1 and C2 are established, the wireless communication method of bicycle according to the first embodiment of the present disclosure has the anti-theft effect. Taking an illustrative example, after the user brings the intermediate device 5 away from the bicycle, the master controller 1 and the slave controller 3 respectively detect the disconnection of the first communication connection C1 and the second communication connection C2 and then respectively enter into the sleep mode. Therefore, other users cannot operate the master controller 1 or the slave controller 3 until the user with the identical intermediate device 5 re-establish the first communication connection C1 and the second communication connection C2. Because the master controller 1 and the slave controller 3 cannot have a direct communication connection with each other at any time, it can effectively avoid other users without the intermediate device 5 to operate the electrical gear-shifting system of the bicycle. On the other hand, as for the master controller 1 and the slave controller 3, the power consumption of the wireless communication can be reduced by detecting whether the communication connections C1 or C2 are disabled and determining whether or not to enter into the sleep mode.

Figure 3:
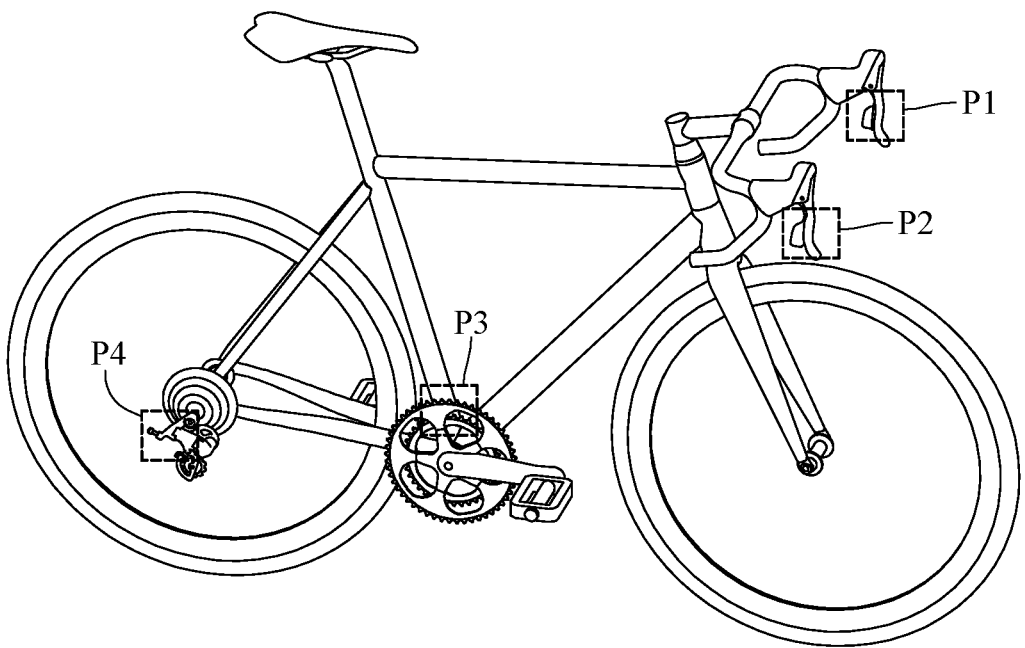
FIG. 3 is a schematic diagram of the installation positions of the wireless communication system of bicycle.

Please refer to FIG. 3, which is a schematic diagram of the installation positions of the wireless communication system of bicycle. In the previous description about the first embodiment, only one master controller 1 and one slave controller 3 are used to illustrate the wireless communication method of the present disclosure. However, a person skilled in the art may easily to deduce that the bicycle's electrical gear-shifting system has two master controllers 1 respectively located on the left shift lever (such as the first position P1 in FIG. 3) and the right shift lever (such as the second position P2) and two slave controller 3 respectively located on the front derailleur (such as the third position P3 in FIG. 3) and the rear derailleur (such as the third position P4). The intermediate device 5 is brought by the user who rides the bicycle. In addition, the intermediate device 5 may further comprise a storage unit recording the device identification number of the controller which allows connection establishment and a counter recording the number of current communication connections. Therefore, when the number of connecting devices exceeds the maximum connection number (generally this value must be 4) of the intermediate device 5, or when the intermediate device 5 connects to a controller with unknown device identification number, the intermediate device 5 will automatically disable the communication connection requirements of the above conditions.

Figure 4:
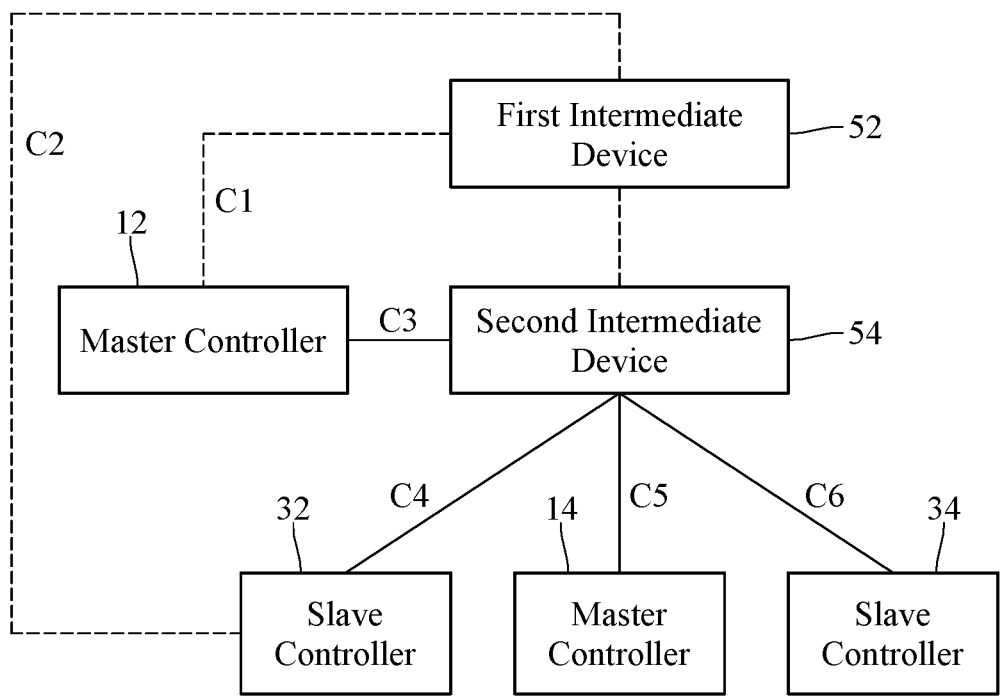
FIG. 4 is a schematic diagram of the communication connections of the wireless communication method of bicycle according to the second embodiment of the present disclosure.

Please refer to FIG. 4, which is a schematic diagram of the communication connections of the wireless communication method of bicycle according to the second embodiment of the present disclosure. In the first embodiment, the rider brings the intermediate device 5 which takes charge of wireless signal transmission work. In the second embodiment, after the first intermediate device 52 (which is equivalent to intermediate device 5 in the first embodiment) authorizes the second intermediate device 54, the second intermediate device 54 takes charge of subsequent wireless signal transmission work. The second intermediate device 54 is installed near the installed position of the master controller on the bicycle.

Please refer to FIG. 3 and FIG. 4, FIG. 4 is a schematic diagram of the communication connections of the wireless communication method of bicycle according to the second embodiment of the present disclosure. The wireless communication system of bicycle adapted to the second embodiment is identical as that for the first embodiment. The wireless communication system comprises the master controller 12, the slave controller 32 and the first intermediate device 52, wherein the slave controller 32 locates on the third position P3 where the front derailleur is installed and the first intermediate device 52 is brought by the user who rides the bicycle. The master controller 12 combines with the second intermediate device 54, both them locate on the first position P1 where the left shift level is installed. In practice, the master controller 12 may electrically connect to the second intermediate device 54 through the physical wirings to construct an integrated control unit. Specifically, this integrated control unit has a first relay mode and a second relay mode. When the integrated control unit is in the first relay mode, the master controller 12 proceeds the signal transmission through the first intermediate device 52 according to the manner described in the first embodiment. When the integrated control unit is in the second relay mode, the master controller 12 proceeds the signal transmission through the second intermediate device 54 according to the manner described in the second embodiment. The switching between the first relay mode and the second relay mode is determined, for example, by the master controller 12 detecting whether it has the first communication connection C1, or whether the authorized information is sent through the first intermediate device 52. However, the present disclosure does not limit the switching mode of the relay mode.

In the second embodiment of the wireless communication method according to the present disclosure, firstly, the master controller 12 and the first intermediate device 52 establish the first communication connection C1, and the slave controller 32 and the first intermediate device 52 establish the second communication connection C2. After the first communication connection C1 and the second communication connection C2 are established, the first intermediate device 52 sends the authorized information to the second intermediate device 54, a specific manner is, for example, triggering the trigger unit on the first intermediate device 52 to send an authorized information by the user. The triggering manner is to press the trigger unit such as a button or a switch on the first intermediate device 52. The authorized information comprises, for example, the aforementioned trustworthy information whose function is to enable the second intermediate device 54 to establish the communication connection with the master controller 12 and the slave controller 32 instead of the first intermediate device 52.

After the second intermediate device 54 receives the authorized information, the first intermediate device 52 disables the first communication connection C1 and the second communication connection C2. The manners to disable the communication connections may be an active disconnection, for example, turning off the power of the first intermediate device 52 by the user, or a passive disconnection, for example, bringing the first intermediate device 52 away from the bicycle by the user so that the master controller 12 and the slave controller 32 cannot detect the first communication connection C1 and the second communication connection C2 respectively thus disabling the communication connections C1 and C2 respectively.

After the first communication connection C1 and the second communication connection C2 are disabled, the master controller 12 establishes the third communication connection C3 to the second intermediate device 54 and the slave controller 32 establish the fourth communication connection C4 to the second intermediate device 54. Regarding the establishment method of the third communication connection C3, for example, the aforementioned integrated control unit switches to the second relay mode and enables the third communication connection C3 constructed by physical wirings between the master controller 12 and the second intermediate device 54 when receiving the authorized information. Regarding the establishment of the fourth communication connection C4, for example, the slave controller 32 firstly broadcasts the identification information representing itself, under the condition that the second intermediate device 54 of the integrated control unit has received the authorized information, the integrated control unit stores the identification information and established the fourth communication connection C4 when receiving the identification information.

After the third communication connection C3 and the fourth communication connection C4 are established, the master controller 12 sends the control signal to the second intermediate device 54 through the third communication connection C3. The second intermediate device 54 sends the control signal to the slave controller 34 through the fourth communication connection C4.

Please refer to FIG. 3 and FIG. 4. In practice, another master controller 14 located on the second position P2 where the right shift lever is installed may follow the established manner of the fourth communication connection C4 described before to establish the sixth communication connection C6 to the second intermediate device 54. Similarly, another slave controller 54 located on the fourth position P4 where the rear derailleur is installed may follow the established manner of the fourth communication connection C4 described before to establish the sixth communication connection C6 to the second intermediate device 54. Said another master controller 14 sends another control signal to the second intermediate device 54 through the fifth communication connection C5 while the second intermediate device 54 sends another control signal to said another slave controller 34 through the sixth communication connection C6.

In the second embodiment of the present disclosure, in addition to the effect of anti-theft introduced in the first embodiment, the design of authorization from the first intermediate device 52 to the second intermediate device 54 may become an alternative solution when the user does not bring the first intermediate device 52 or when the first intermediate device 52 is out of power. Therefore, compared to the first embodiment, the second embodiment allows users to choose not to carry the first intermediate devices 52 (e.g., a smartphone) with them and has the effect of extending the service time of the electrical gear-shifting. Furthermore, in order to recover the error connection caused by a human factor during the establishment of the communication connection, the master controller 12, the slave controller 32, said another master controller 14 or said another slave controller 34 may provide a mechanism for deleting the stored identification. For example, in practice, the procedure of deleting identification information can be activated by triggering the trigger unit on the controller.

To sum up, the wireless communication system of bicycle and the method thereof according to the embodiments of the present disclosure adopt a trustworthy intermediate device to establish communication connections with the left and the right shift levers and with the front and the rear derailleur respectively and transmit the gear-shifting signal or the status signal in wireless communication manner. It can be ensured that after the intermediate device is brought away from the bicycle, users who do not have the same intermediate device cannot arbitrarily use the electrical gear-shifting system of bicycle, thereby achieving the anti-theft effect.

What is claimed is:

1. A wireless communication method adapted to an electrical gear-shifting system of a bicycle, comprising:
   establishing a first communication connection to an intermediate device by a master controller;
   establishing a second communication connection to the intermediate device by a slave controller;
   sending a control signal to the intermediate device through the first communication connection by the master controller; and
   sending the control signal to the slave controller through the second communication connection by the intermediate device;
   wherein the slave controller controls a motor driver to perform a gear-shifting operation according to the control signal;
   wherein after the intermediate device is away from the electrical gear-shifting system, the first communication and the second communication are disconnected.

2. The method according to claim 1, after establishing the first and the second communication connections, further comprising:
   sending a status signal to the intermediate device through the second communication connection by the slave controller; and
   sending the status signal to the master controller through the first communication connection by the intermediate device selectively.

3. The method according to claim 2, wherein the intermediate device further comprises a display unit, and the method further comprises: showing a gear information or a power information by the intermediate device after sending the status signal to the intermediate device through the second communication connection by the slave controller.

4. The method according to claim 1, wherein the intermediate device further comprises a display unit, and the method further comprises: showing a gear information or a power information by the intermediate device after sending the control signal to the intermediate device through the first communication connection by the master controller.

5. The method according to claim 1, after the first communication connection is established, further comprising:
   detecting the first communication connection by the master controller; and
   activating a sleep mode of the master controller when the first communication connection is disabled.

6. The method according to claim 1, after the second communication connection is established, further comprising:
   detecting the second communication connection by the slave controller; and
   activating a sleep mode of the slave controller when the second communication connection is disabled.

7. The method according to claim 1, wherein the intermediate device is a first intermediate device and the master controller further combines with a second intermediate device, and the method further comprises:
   sending an authorized information to the second intermediate device by the first intermediate device and disabling the first and the second communication connection;
   receiving the authorized information by the second intermediate device and broadcasting the authorized information;
   establishing a third communication connection to the master controller by the second intermediate device according to the authorized information;
   establishing a fourth communication connection to the second intermediate device by the slave controller;
   sending the control signal to the second intermediate device through the third communication connection by the master controller; and
   sending the control signal to the slave controller through the fourth communication connection by the second intermediate device.

8. The method according to claim 7, after sending the authorized information to the second intermediate device by the first intermediate device, further comprising,
   establishing a fifth communication connection to the second intermediate device by another master controller;
   establishing a sixth communication connection to the second intermediate device by another slave controller;
   sending another control signal to the second intermediate device through the fifth communication connection by said another master controller; and
   sending said another control signal to another slave controller through the sixth communication connection by the second intermediate device.

9. The method according to claim 7, wherein the first intermediate device has a trigger unit configured to generate the authorized information by triggering.

10. The method according to claim 7, wherein the second intermediate device is installed on a body of the bicycle and is near an installed position of the master controller.

11. The method according to claim 7, wherein the establishment of the fourth communication connection further comprises,
   receiving the authorized information and sending an identification information by the slave controller, wherein the identification information is configured to represent the slave controller; and
   receiving the identification information through the second intermediate device and storing the identification information by the master controller.

12. The method according to claim 11, further comprising deleting the stored identification information by the slave controller.

13. The method according to claim 1, wherein the intermediate device being away from the electrical gear-shifting system is defined as that the intermediate device is outside a communication range of the master controller and a communication range of the slave controller.

14. A wireless communication system of a bicycle including an electrical gear-shifting system comprising:
   a master controller comprising a trigger device and a first communication unit, wherein the trigger device electrically connects to the first communication unit, the trigger device is configured to generate a control signal according to a trigger event, and the first communication unit is configured to send the control signal;
   a slave controller comprising a driving device and a second communication unit, wherein the driving device electrically connects to the second communication unit, the driving device is configured to drive a controlled device according to the control signal, and the second communication unit is configured to receive the control signal; and
   an intermediate device comprising a first communication connection with the master controller and a second communication connection with the slave controller, wherein the intermediate device is a portable device and is configured to send a broadcast signal for establishing the first communication connection to the master controller and the second communication connection to the slave controller respectively, wherein after the intermediate device is away from the electrical gear-shifting system, the first communication and the second communication are disconnected; and the intermediate device receives the control signal through the first communication connection and sends the control signal through the second communication connection.

15. The wireless communication system of the bicycle of claim 14, wherein the intermediate device being away from the electrical gear-shifting system is defined as that the intermediate device is outside a communication range of the master controller and a communication range of the slave controller.

* * * * *